United States Patent

Jordan, Jr.

[15] 3,653,004

[45] Mar. 28, 1972

[54] READ-ONLY MEMORY ORGANIZATION

[72] Inventor: William F. Jordan, Jr., Wellesley, Mass.

[73] Assignee: Honeywell Inc., Minneapolis, Minn.

[22] Filed: May 25, 1970

[21] Appl. No.: 40,019

[52] U.S. Cl. ....................340/173 SP

[51] Int. Cl. ....................G11c 17/00

[58] Field of Search .........340/173 SP, 174 SP, 166, 347 DD, 340/147 R, 174 LA

[56] References Cited

UNITED STATES PATENTS 3,174,145 3/1965 Busch ....................340/347

3,153,781 10/1964 Quiogue ....................340/347

3,154,763 10/1964 Bornhauser ....................340/174 LA

*Primary Examiner*—Stanley M. Urynowicz, Jr.

*Attorney*—Fred Jacob and Ronald T. Reiling

[57] ABSTRACT

A read-only memory organization having a plurality of matrices, each of the matrices including digit lines and word lines orthogonal thereto. The word lines are coupled to the output lines of word selection means by coupling means such as diodes or transistors. Information is stored in the memory by selectively interconnecting the digit lines and the word lines in each of the matrices, the interconnections being a maximum of one for each word line. The number of coupling means is equal to the number of word lines in each of the matrices. An encoder is provided for each of the matrices to encode the information stored at the interconnections.

17 Claims, 6 Drawing Figures

INVENTOR
WILLIAM F. JORDAN, JR.
BY
John S. Solakian
ATTORNEY

INVENTOR
WILLIAM F. JORDAN, JR.
BY
John S. Solakian
ATTORNEY

INVENTOR
WILLIAM F. JORDAN, JR.
BY
John S. Solakian
ATTORNEY

READ-ONLY MEMORY ORGANIZATION

BACKGROUND OF THE INVENTION

1. Field of the Invention

The present invention relates generally to read-only memories and more particularly to a new organization for read-only memories.

2. Description of the Prior Art

A read-only memory organization typical of the prior art is shown in the drawings at FIG. 1. Therein is illustrated a diode matrix 10 having word lines 14, 15, 16 and 17 and digit lines 18 through 23. Information is stored in this matrix by coupling the word and digit lines by diodes 11 at selected locations. The diodes 11 may be replaced by transistors. At those locations in which information is not stored, diodes 11 are open circuited as indicated by the circles 13. The array shown is a 4-by-6 array although it will be appreciated that any number of lines may be employed. In this configuration input signals selectively applied by selection logic 12 to word lines 14 through 17 will produce outputs on digit lines 18 through 23.

As an example of the use of this array, it will be seen that an input at terminal 14 of the matrix will product outputs at terminals 18 through 22, while no output will appear on digit line 23. It will be appreciated that the six outputs taken together will represent the binary number 111110. Whenever an input is applied to terminal 14, the output terminals will produce this same binary number. Similarly each of the selected word lines 15 through 17 will produce a binary output number in accordance with the diodes arranged between the orthogonal sets of word lines and digit lines. If word line 15 is selected the binary number 111011 will so appear, if word line 16 is selected, the binary number 111000 will appear, whereas if word line 17 is selected the binary number 100000 will appear.

It will be appreciated that in the traditional read-only memory organization shown in FIG. 1, the total number of semiconductors is at least equal in number to the number of information bits stored. Typically, however, the number of such semiconductors is equal to the number of word lines times the number of digit lines, wherein the crossovers not storing information bits have such semiconductors open circuited. Thus the information bits are stored in the semiconductors.

It is therefore an object of the present invention to provide an improved read-only memory organization.

It is another object of the invention to provide a read-only memory organization requiring a minimal number of semiconductors.

It is a further object of the invention to provide an improved read-only memory which utilizes a minimal number of semiconductors, which is simpler in construction, smaller in size and minimal in cost.

SUMMARY OF THE INVENTION

The purposes and objects of the present invention are satisfied by providing word selection means having a plurality of output lines, by providing a plurality of matrices, each of the matrices including a plurality of word lines and a plurality of digit lines arranged substantially orthogonal to the word lines and wherein information bits are stored in the memory by coupling selected digit lines with selected word lines in each of the matrices. A plurality of coupling means, such as semiconductors, are each coupled between one of the output lines and one of the word lines. The maximum number of these coupling means being that number of word lines in each of the matrices. Also included are a plurality of encoders, each connected to receive the digit lines in their respective matrices thereby converting information bits stored in the matrices into coded information.

BRIEF DESCRIPTION OF THE DRAWINGS

The advantages of the foregoing configuration of the present invention will become more apparent upon reading the accompanying detailed description in conjunction with the figures in which.

DETAILED DESCRIPTION OF THE PREFERRED EMBODIMENTS

Figure 1:
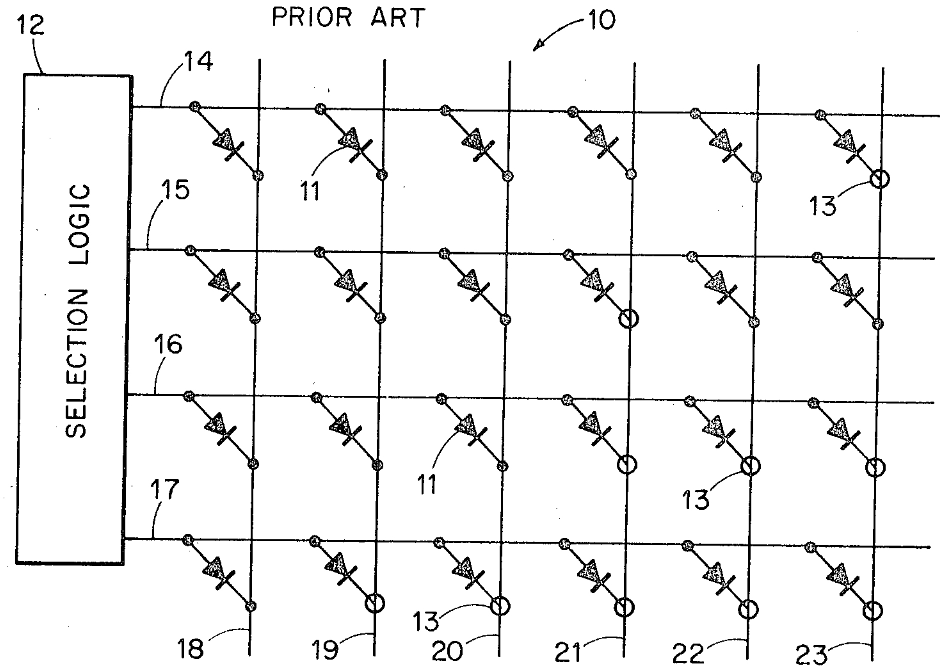
FIG. 1 is a schematic diagram of a prior art read-only memory organization.

For simplicity each of the embodiments of the present invention illustrated in FIGS. 2 through 6 will produce the same outputs on lines 18 through 23 for selected inputs on lines 14 through 17 as did the prior art example shown in FIG. 1.

Figure 2:
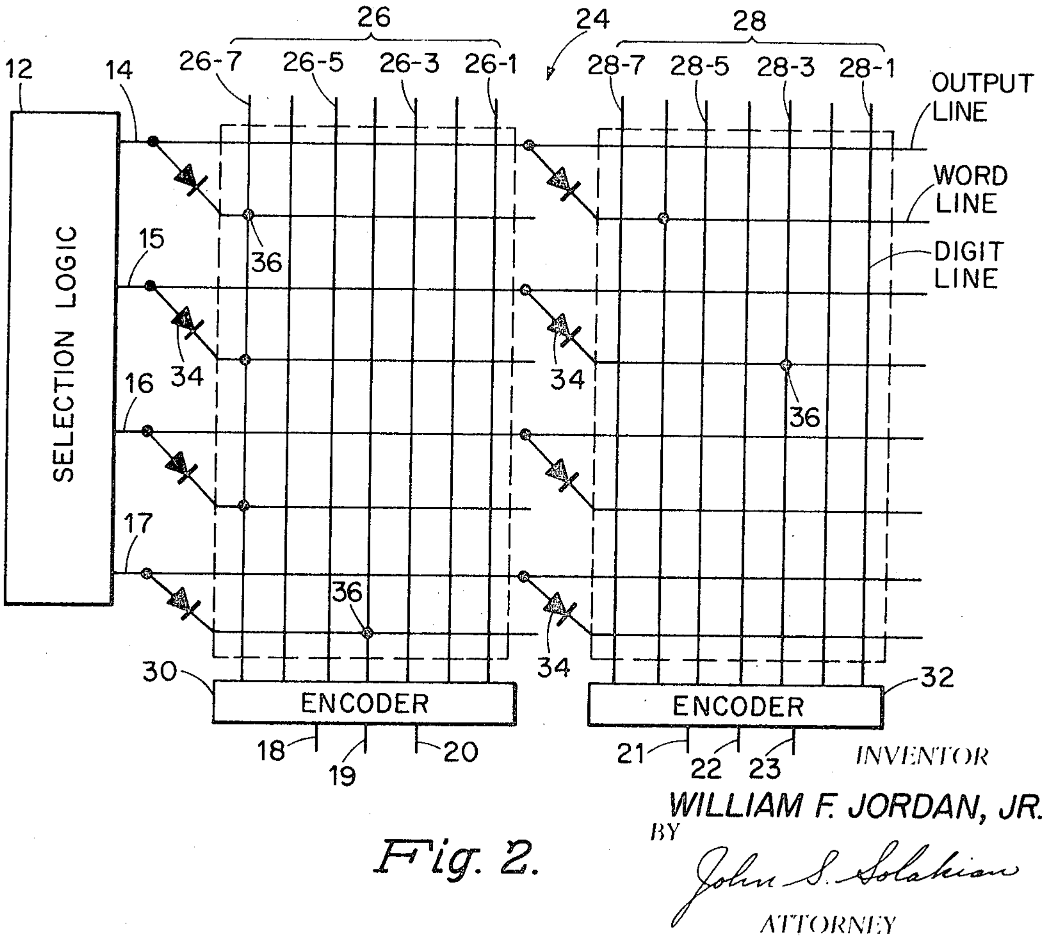
FIG. 2 is a schematic diagram of a preferred embodiment of the invention showing a memory arranged in matrices.

In FIG. 2 memory 24 includes two matrices 26 and 28. Matrix 26 includes digit lines 26–1 through 26–7 whereas matrix 28 includes digit lines 28–1 through 28–7. The number following the numeral 28– indicates the numerical weight of the digit line. Common to each of the matrices 26 and 28 are output lines 14 through 17. Although such output lines do not necessarily form an intrinsic part of such matrices, the output lines are connected through diodes 34 to word lines in each of the matrices. The word lines are an intrinsic part of the matrices and correspond in number for each of the matrices to the number of output lines. The total number of word lines for the memory 24 is the number of output lines times the number of individual matrices, in this case eight. The number of diodes 34 is no more than the number of output lines times the number of individual matrices, also in this case eight. Intercoupling between each of the digit lines and the word lines are provided by simple mechanical bonding or by other means such as capacitive coupling, magnetic cores, diodes all of which are generally indicated at point 36. The number of such connections on each of the word lines is a maximum of one, that is, no more than one digit line can be coupled to any one word line. It can be appreciated that the individual matrices 26 and 28 and as shown within the dotted lines may be replaced without replacing the diodes 34. That is, if such matrices are individual boards they may be disconnected and replaced by other matrices storing different information patterns. Such replacement cost is minimal since the diodes are not being replaced.

Selection logic 12 which may be any logic configuration well known in the art and will generate a selection pulse on any one of output lines 14 through 17. The output line selected will in turn select corresponding word lines in the matrices 26 and 28. The information pattern stored therein by such connections 36 are encoded by encoders 30 and 32 respectively to produce outputs on lines 18 through 23. Encoders 30 and 32 are also well known in the art and may include 1 of *n*-to-binary converters, (where *n* is the number of digit lines) as for example decimal-to-binary converters. For example, if an information bit is stored on digit line 26–7, selection thereof will produce a binary signal 111, which is representative of the decimal seven, on lines 18, 19 and 20 respectively. Also, if an information bit is stored on digit line 28–6 the decoder 32 generates a binary output 110 on lines 21, 22 and 23 respectively in response to a selection pulse on output line 14.

Thus in operation it can be seen that read only memory 24 will produce binary number 111110 on lines 18 through 23 if output line 14 is selected by selection logic 12. If output line 15 is selected the output on lines 18 through 20 will be the same as for the selection as output line 14, that is, the binary number 111 will appear. However, the output on lines 21 through 23 will be the binary number 011 since the digit line 28–3 is coupled to the output line 15. That is, the weight of digit line 28–3 is the decimal three which is designated as a binary number by 011. This code corresponds to the code produced by the memory 10 shown in FIG. 1. Likewise, if output line 16 is selected, the binary number 111 will appear on lines 18, 19 and 20 whereas since there is no interconnection 36 on the word line associated with output line 16 and matrix 28 the output on lines 21 through 23 will be 000. In a similar fashion the binary number of lines 18 through 23 for the selection of output lines 17 will be the binary number 100000, also corresponding to the prior art memory 10 shown in FIG. 1.

Figure 3:
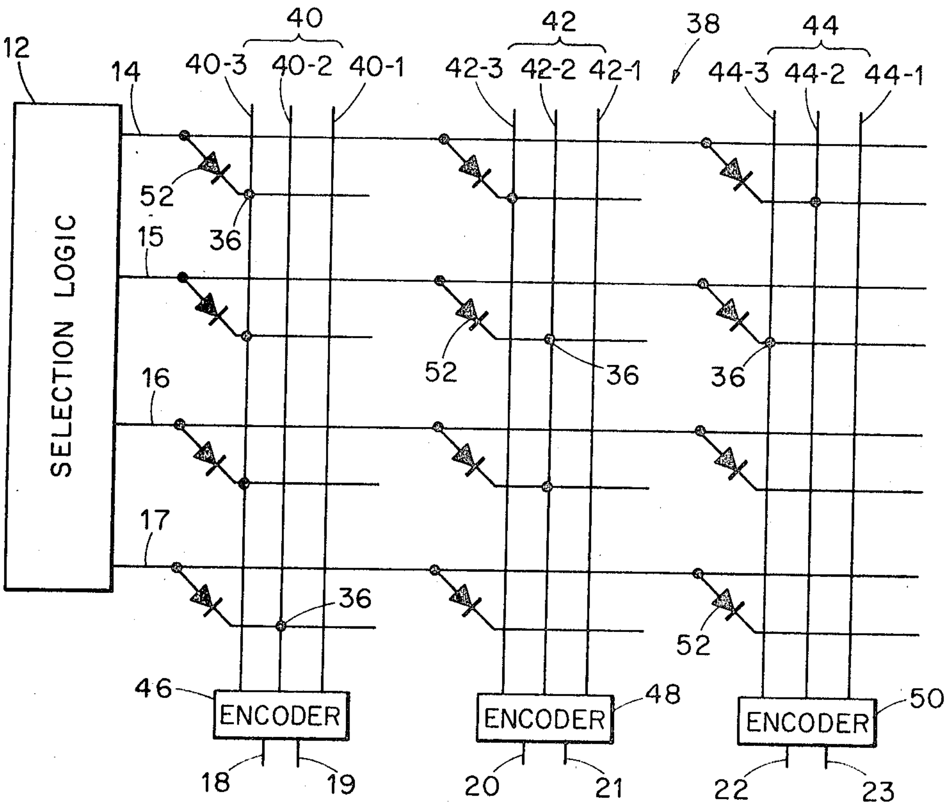
FIG. 3 is a schematic diagram of a preferred embodiment of the invention showing a memory divided into three matrices.

It has thus been seen that the new read only memory organization shown in FIG. 2 utilizes fewer diodes than the traditional organization of the prior art shown in FIG. 1. Namely, for a memory 24 divided into two segments or matrices 26 and 28 only eight diodes are used and in fact two of them corresponding to output lines 16 and 17 and matrix 28 could have been omitted. For the same output the prior art memory 10 utilizes a minimum of fourteen diodes and a maximum of twenty four diodes. The organization of memory 24 is not limited to the two matrices shown. In fact, for the same output signal three matrices may have been utilized. To illustrate this point and by way of example the organization of FIG. 3 is shown wherein the memory 38 is divided into three matrices 40, 42 and 44. The digit lines of which are weighted as decimals one, two and three. The encoders 46, 48 and 50 are identical, and encode the three digit lines into two binary lines. The binary lines 18 through 23 taken together produce the same output signals as was shown for the memories of FIG. 1 and FIG. 2. It can also be seen however, that by utilizing fewer digit lines in each of the matrices that a greater number of diodes must be used. This is, in this case, twelve diodes are utilized, three of which may have been omitted, as compared to the memory 24 in FIG. 2 wherein only eight diodes are used. However, memory 24 utilizes seven digit lines in each matrix. Accordingly, it can be seen that the number of digit lines increases as the number of diodes decrease. That is, for the fewer diodes used a sacrifice must be made which is the use of additional digit lines for each matrix. However, the addition of more digit lines is inexpensive considering that fabrication interconnection technologies, such as, printed circuits, welded flat cables, thick films, thin films, weaving, etc. may be used. The cost of such orderly interconnections is significantly smaller than the diode it replaces even in the large scale integrated circuit diode array. Thus an optimum arrangement may be picked considering the amount of digit lines, number of diodes and the number and complexity of the encoders used. The encoders used in memory 38 are each identical to each other. Also the encoders used in the memory 24 of FIG. 2 are identical to each other.

Figure 4:
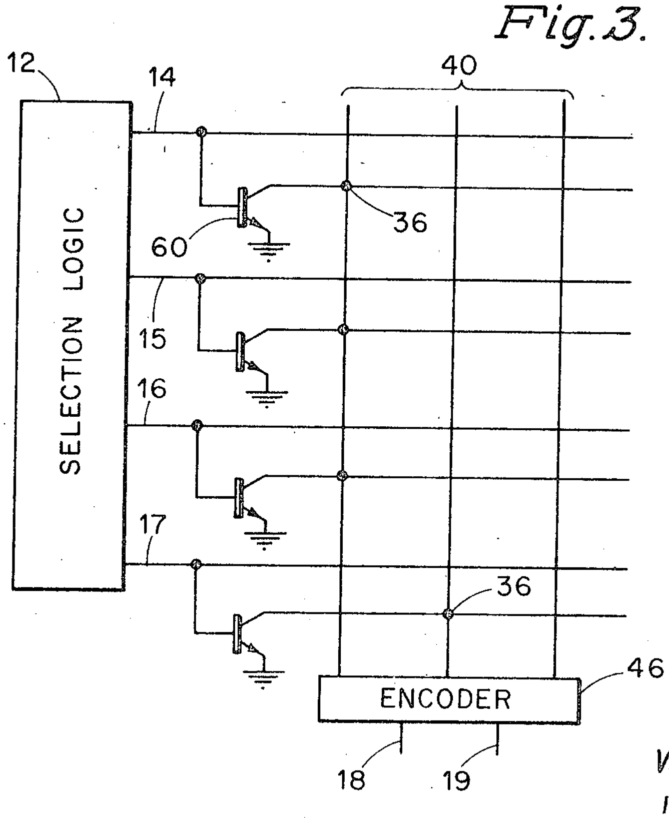
FIG. 4 is a schematic diagram illustrating a partial view of the memory of FIG. 3 wherein transistors, rather than diodes are utilized as coupling means.

In each of the illustrations of FIGS. 1, 2 and 3, diodes are shown. However, it can be appreciated that transistors may have been utilized in place of the diodes. By utilizing transistors, they provide more efficient silicon real estate utilization and their gain enhances the switching performance. One such transistor interconnection arrangement is shown in FIG. 4 wherein the transistors 60 are connected in common emitter configuration, the bases of which are coupled to the output lines and the collectors of which are coupled to the word lines. It should be understood that such transistors could also be connected in the common collector configuration wherein the emitter would be connected to the respective word lines and the bases would be coupled to the output lines. Other such arrangements replacing the sole transistors 60 may have included transistor-transformer and/or transistor-inductor arrangements, etc. It should also be understood that such transistors may have been utilized as part of the selection logic as shown in U.S. Pat. No. 2,992,409, issued July 11, 1961 (FIG. 1), wherein selection logic divided into vertical and horizontal segments would couple to the emitters and bases of the transistors whose collectors would couple to the respective word lines. Thus the transistors would perform the dual function of selection and coupling.

Figure 5:
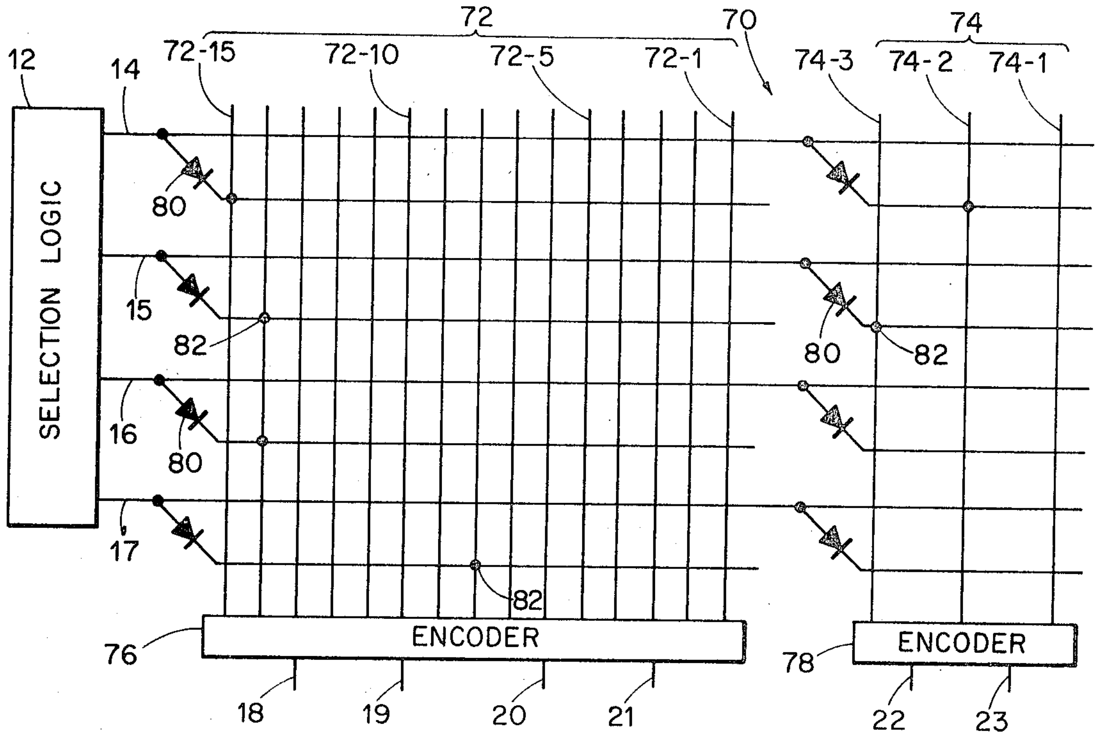
FIG. 5 is a schematic diagram of the memory divided into two matrices having an unequal number of digit lines.

The novel read only memory arrangements shown in FIGS. 2 and 3 included matrices having an equal number of digit lines. The concept however is not so limited. As can be seen in FIG. 5 wherein memory 70 is segmented into two matrices 72 and 74 wherein matrix 72 includes 15 digit lines and matrix 74 includes three digit lines in order to produce the same output on lines 18 through 23. In this case just eight diodes are used as was the case for the memory in FIG. 2. However, unlike the memory 24 of FIG. 2 a total number of 18 digit lines are used whereas the memory 24 utilized only 14 digit lines. Also the encoder 76 and 78 are not identical because encoder 76 must convert 15 decimal lines into four binary lines and because encoder 78 must convert three decimal lines into two binary lines. The interconnections 82 are made in a similar manner as were the interconnections 36. Thus memory 70 generates the binary number 1111 on lines 18 through 21 when output line 14 is selected by selection logic 12, i.e., since the digit line 72–15 is coupled to the word line coupled to output line 14, this decimal weight of fifteen encodes into the binary number as stated. The binary number 10 is generated on lines 22 and 23 respectively. For the selection of output line 15 a binary number 111011 is produced on the lines 18 through 23. The remaining word lines in both matrices function in a similar manner.

Figure 6:
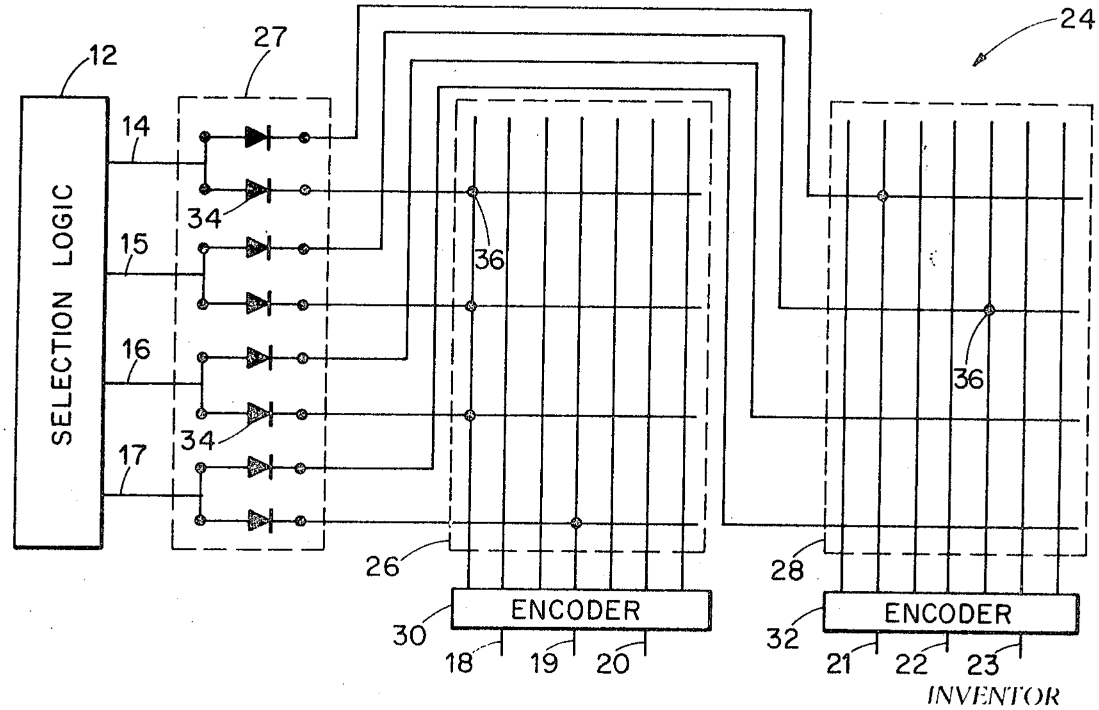
FIG. 6 is a schematic diagram illustrating the embodiment of FIG. 2 in a modular arrangement.

Memory 24 in FIG. 2 was shown with the output lines running directly through each of the matrices 26 and 28. Such construction is not required, however. As shown in FIG. 6, the output lines may be coupled directly to the diodes 34 in module 27 whereas the corresponding word lines for each of the matrices 26 and 28 may be run directly to such matrices. Thus the number of horizontal lines running through the matrices 26 and 28 are reduced by a factor of two. Accordingly, since the matrices 26 and 28 as shown within the dotted lines may be individually replaced, the number of interconnections between such matrices and the encoders, diodes and selection logic 12 is minimized. As shown, of course, the diodes 34 may be included in a module 27 which may also be replaceable.

Having now described the invention what is claimed as new and novel and for which it is desired to secure Letters Patent is:

1. A read only memory comprising:

A. means for receiving input signals on a plurality of output lines;

B. a plurality of matrices each comprising:

1. a plurality of word lines, and 2. a plurality of digit lines arranged substantially orthogonal to said word lines, said word lines and said digit lines electrically coupled at crossovers thereof in accordance with the information stored in said memory;

C. A plurality of coupling means interconnecting each of said word lines with a corresponding one of said output lines;

D. encoding means having a plurality of inputs and outputs, said inputs coupled to said digit lines, whereby an input signal received on one of said output lines causes an encoded signal corresponding to said stored information to appear at said plurality of outputs.

2. A memory as defined in claim 1 wherein said coupling means include semiconductors.

3. A memory as defined in claim 1 wherein said word lines in each of said matrices correspond in number to the number of said output lines and wherein the number of said semiconductors corresponds to the number of said word lines.

4. A memory as defined in claim 3 wherein the number of electrical couplings at said crossovers on each of said word lines is a maximum of one.

5. A memory as defined in claim 4 wherein a first one of said matrices generates the most significant signals corresponding to said stored information and wherein the last one of said matrices generates the least significant signals corresponding to said stored information.

6. A memory as defined in claim 5 wherein said encoder means includes a plurality of 1 to *n* to binary encoders corresponding in number to the number of said matrices.

7. A memory as defined in claim 6 wherein said digit lines represent selected values.

8. A memory as defined in claim 7 wherein said 1 of n values are decimal values.

9. A memory as defined in claim 7 wherein each of said matrices is modular in construction.

10. A memory as defined in claim 7 wherein the number of digit lines in each of said matrices is equivalent and wherein each of said encoders is substantially identical.

11. A memory as defined in claim 7 wherein the number of digit lines in each of said matrices is different.

12. A read only memory comprising:

A. selection means having a plurality of output lines;

B. a first plurality of digit lines;

C. a second plurality of digit lines;

D. a plurality of coupling means each selectively coupled between said output lines and said first and second plurality of digit lines, thereby storing information in said memory, wherein no more than one of said digit lines in each of said first and second plurality of digit lines is coupled to one of said output lines by one of said coupling means; and E. encoder means coupled to said first and second plurality of digit lines to provide an output signal at a plurality of output terminals, said signal corresponding to the arrangement of said coupling means on the output line selected and said signal comprising a plurality of subsignals each appearing substantially simultaneously at said output terminals.

13. A memory as defined in claim 12 wherein said coupling means includes semiconductors.

14. A memory as defined in claim 13 wherein said first plurality of digit lines corresponds to the least significant digits of the information stored in said memory and wherein said second plurality of digit lines corresponds to the most significant digits of the information stored in said memory.

15. A memory as defined in claim 14 wherein

A. said digit lines in each of said first and second plurality of digit lines correspond to selected decimal values;

B. said encoder means includes first and second encoders coupled to said first and said second plurality of digit lines respectively; and C. each of said first and second encoders converts the 1 of n value of a digit line to a binary number.

16. A memory as defined in claim 15 wherein said semiconductors are diodes.

17. A memory as defined in claim 15 wherein said semiconductors are transistors.

* * * * *